United States Patent [11] 3,621,051

[72] Inventors Ingenuin Hechenbleikner
Kenwood;
John F. Hussar, Loveland; Arthur F.
Koeniger, Cincinnati; William P. Enlow,
Reading, all of Ohio
[21] Appl. No. 801,791
[22] Filed Feb. 24, 1969
[45] Patented Nov. 16, 1971
[73] Assignee Carlisle Chemical Works, Inc.
Reading, Ohio

[54] SUBSTITUTED (4-BENZOYL-2-HYDROXY PHENOXY) ALKYL THIOALKANOIC ACID ESTERS
11 Claims, No Drawings
[52] U.S. Cl. ................................... 260/470,
252/300, 260/45.85, 260/481 R, 424/60
[51] Int. Cl. ..................................... C07c 149/40
[50] Field of Search ........................... 260/470

[56] References Cited
FOREIGN PATENTS
1,001,062  8/1965  England ...................... 260/470

Primary Examiner—James A. Patten
Assistant Examiner—John F. Terapane
Attorney—Cushman, Darby & Cushman ABSTRACT: Compounds are prepared having the formula

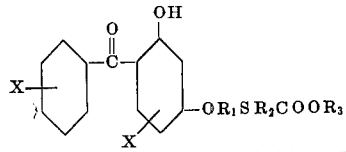

where X is H, OH, $R_4$, $OR_4$ or halogen, $R_1$ is hydrocarbyl of two to six carbon atoms, $R_2$ is hydrocarbyl of one to four carbon atoms, $R_3$ is hydrocarbyl of one to 22 carbon atoms. The compounds are useful as heat and light stabilizers for organic polymers, particularly alpha mono-olefin polymers.

SUBSTITUTED (4-BENZOYL-2-HYDROXY PHENOXY) ALKYL THIOALKANOIC ACID ESTERS

The present invention relates to novel substituted benzophenones and their use as heat and light stabilizers.

It is an object of the present invention to prepare novel 2-hydroxy benzophenones.

Another object is to stabilize polymers and other materials to the action of heat and light.

A more specific object is to stabilize hydrocarbon polymers against the action of ultraviolet light.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by preparing compounds of the following Formula I and using them to stabilize polymers and other materials against heat and light, particularly ultraviolet light.

FORMULA I

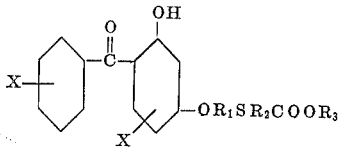

where X is H, OH, $R_4$, $OR_4$ or halogen, $R_1$ is hydrocarbyl of two to six carbon atoms, $R_2$ is hydrocarbyl of one to four carbon atoms, $R_3$ is hydrocarbyl of one to 22 carbon atoms and $R_4$ is hydrocarbyl of one to 22 carbon atoms. Preferably the hydrocarbyl radicals are alkyl (including cycloalkyl) but they can be aryl or alkenyl for example. The halogen is preferably chlorine but can be bromide, fluorine or iodine.

Examples of compounds of the present invention within Formula I are 2-hydroxy-4-(oxypropyl-3-thio lauryl propionate) benzophenone, 2-hydroxy-4-(oxypropyl-3-thio lauryl acetate) benzophenone, 2-hydroxy-4-(oxypropyl-3-thio butyl propionate) benzophenone, 2-hydroxy-3-methyl-4-(oxypropyl-3-thio lauryl propionate) benzophenone, 2-hydroxy-4-(oxy-2-methylpropyl-3-thio octadecyl propionate) benzophenone, 2-hydroxy-4-(oxypropyl-2-thio butyl acetate) benzophenone, 2-hydroxy-4-(oxyethyl-2-thio methyl acetate) benzophenone, 2-hydroxy-4-(oxyethyl-3-thio methyl propionate) benzophenone, 2-hydroxy-4-(oxybutyl-2-methyl-2-thio docosyl acetate) benzophenone, 2-hydroxy-4-(oxypropyl-3-thio docosyl propionate) benzophenone, 2-hydroxy-4-(oxyethyl-3-thio methyl pyruvate) benzophenone, 2-hydroxy-4-(oxyethyl-3-thio dodecyl propionate)-2'-hydroxy benzophenone, 2-hydroxy-4-(oxypropyl-3-thio decyl propionate)-2'-hydroxy benzophenone, 2-hydroxy-4-(oxyethyl-3-thio dodecyl propionate)-4'-chloro benzophenone, 2-hydroxy-4-(oxypropyl-2-thio octadecenyl acetate)-4'-bromo benzophenone, 2-hydroxy-4-(oxypropyl-2-methyl-3-thio lauryl propionate) benzophenone, 2-hydroxy-4-(oxypropyl-2-methyl-2-thio lauryl acetate) benzophenone, 2-hydroxy-4-(oxyethyl-3-thio octyl propionate) benzophenone, 2-hydroxy-4-(oxyethyl-3-thio dodecyl propionate)-5-chloro benzophenone, 2-hydroxy-4-(oxyhexyl-3-thio ethyl propionate) benzophenone, 2-hydroxy-4-(oxypropyl-4-thio allyl butyrate) benzophenone, 2-hydroxy-4-(oxyethyl-2-thio cyclohexyl acetate) benzophenone, 2-hydroxy-4-(oxypropyl-3-thio phenyl propionate) benzophenone, 2-hydroxy-4-(oxypropyl-5-thio-p-tolyl valerate) benzophenone, 2-hydroxy-4-(oxyethyl-3-thio-o-tolyl propionate) benzophenone, 2-hydroxy-4-(oxypropyl-2-thio-p-dodecylphenyl acetate) benzophenone, 2-hydroxy-4-(oxyethyl-3-thio benzyl propionate) benzophenone, 2-hydroxy-4-(oxyethyl-2-thio hexyl acetate) benzophenone, 2-hydroxy-4-(oxypropyl-3-thio eicosyl propionate) benzophenone, 2-hydroxy-4-(oxyamyl-3-thio propyl propionate) benzophenone, 2-hydroxy-3-methyl-4-(oxyethyl-3-thio dodecyl propionate) benzophenone, 2-hydroxy-3-methyl-4-(oxypropyl-3-thio hexadecyl propionate)-4'-methyl benzophenone, 2-hydroxy-4-(oxyethyl-2-thio dodecyl acetate)-5-ethyl benzophenone, 2-hydroxy-4-(oxypropyl-3-thio amyl propionate)-5-octadecyl benzophenone, 2-hydroxy-4-(oxypropyl-3-thio dodecyl)-3'-fluoro benzophenone, 2-hydroxy-4-(oxyethyl-3-thio dodecyl propionate)-3'-hydroxy benzophenone, 2-hydroxy-4-(oxypropyl-2-thio octadecyl acetate) 2'-methoxy benzophenone, 2-hydroxy- 4-(oxypropyl-3-thio dodecyl propionate) butoxy benzophenone, 2-hydroxy-4-(oxypropyl-3-thio phenyl propionate) 2'-octadecoxy benzophenone, 2-hydroxy-4-(oxypropyl-3-thio dodecyl propionate)-4'-docosyl benzophenone, 2-hydroxy-4-(oxyethyl-3-thio dodecyl propionate)-2'-methyl benzophenone, 2-hydroxy-4-(oxyethyl-2-thio sec. butyl acetate)-2'-hexyl benzophenone, 2-hydroxy-4-(oxypropyl-3-thio cyclopentyl propionate) 4'-octadecyl benzophenone, 2-hydroxy-4-(oxybutyl-4-thio decenyl butyrate)-5'-docosyl benzophenone, 2-hydroxy-3-methyl-4-(oxyethyl-2-thio dodecyl acetate)-2'-cyclohexoxy benzophenone, 2-hydroxy-4-(oxypropyl-2-thio dodecyl acetate)-2'-phenoxy benzophenone, 2-hydroxy-4-(oxypropyl-3-thio dodecyl propionate)-2'-alpha naphthoxy benzophenone.

The compounds of the present invention can be used to protect the following types of polymers from degradation by light (e.g., ultraviolet light) or heat, vinyl chloride polymers including polyvinyl chlorides and copolymers of vinyl chloride with other materials such as vinyl acetate, vinylidene chloride, acrylonitrile, maleic anhydride, vinyl stearate, ethyl acrylate, methyl acrylate, octyl acrylate, etc., polyvinylidene chloride, chlorinated polyethylene, chlorinated polybutadiene, polystyrene, impact polystyrene, e.g. a mixture of polystyrene with 5 percent butadiene-styrene copolymer, styrene-acrylonitrile-butadiene terpolymer (ABS) polycarbonates, e.g. bisphenol A polycarbonate, polyesters, e.g. polyethylene terephthalate, acrylic and methacrylic polymers, e.g. ethyl acrylate, methyl acrylate, butyl acrylate, methyl methacrylate, epoxies, e.g. bisphenol A-epichlorohydrin, polyolefin rubbers, e.g. polybutadiene, poly cis isoprene, butadiene-styrene copolymer, butadiene-acrylonitrile copolymer, alpha-mono-olefin polymers and copolymers (particularly polymers of alpha mono-olefins having 2 to 10 carbon atoms) e.g. polyethylene, polypropylene, polyisobutylene, butene-1, 3-methylbutene-1, hexene-1, heptene-1, octene-1, decene-1, ethylene-propylene copolymer, ethylene-butene-1 copolymer, ethylene-propylene-cyclo-octadiene terpolymer, ethylene-propylene-norbornadiene terpolymer, etc. There can also be stabilized gasoline, mineral oil and fatty materials of animal or vegetable origin, e.g. linseed oil, menhaden oil, lard, cottonseed oil, partially hydrogenated cottonseed oil, corn oil, peanut oil, palm oil, cod liver oil, coconut oil, butter, beef tallow, etc.

Unless otherwise indicated all parts and percentages are by weight.

The compounds of Formula I can be added in an amount of 0.001 to 10 percent of the material being stabilized but preferably are used in an amount of 0.1 to 1 percent.

The products of the invention can be used alone or with other adjuvants such as mold release agents, e.g. zinc stearate and aluminum stearate, nickel complexes, hindered phenols, thioesters, etc.

Thus there can be used 0.05 to 5.0 percent based on the polymer of nickel complexes such as the nickel dodecyl amine complex of 2,2'-thio bis(p-t-octyphenol), nickel butylamine complex of 2,2'-thio bis(p-t-octylphenol) and other nickel complexes such as those shown in U.S. Pat. Nos. 2,971,940; 3,006,886 and 3,218,294.

Hindered phenols can be added in an amount of 0.01 to 10 percent of the polymer. Examples of such phenols include di(t-butyl) p-cresol, 4,4'-thio bis(6-t-butyl-m-cresol), 2,2'-methylene bis(4-methyl-6-t-butylphenol), 2-t-butyl-4-decyloxyphenol, 2-t-butyl-4-octadecyloxy phenol, 4,4'-methylene bis(2,6-di-t-butylphenol), bis [o-(1,1,3,3-tetramethylbutyl) phenol] sulfide, bis(p-octylphenol) sulfide, etc.

Thioesters can be added in an amount of 0.005 to 10 percent of the polymer. Examples of such thioesters include dilauryl beta-thio dipropionate, dioctadecyl beta-thio dipropionate, dioleyl beta-thio dipropionate.

The substituted benzophenones can be prepared in several different ways.

Method A

An appropriate dihydroxybenzophenone is reacted with a chloroalkylthioalkanoic acid ester in the presence of alkali and an alkali metal iodide, e.g. sodium iodide or potassium iodide. Thus to prepare 2-hydroxy-4-(oxypropyl-3-thiolauryl propionate) benzophenone the equation is

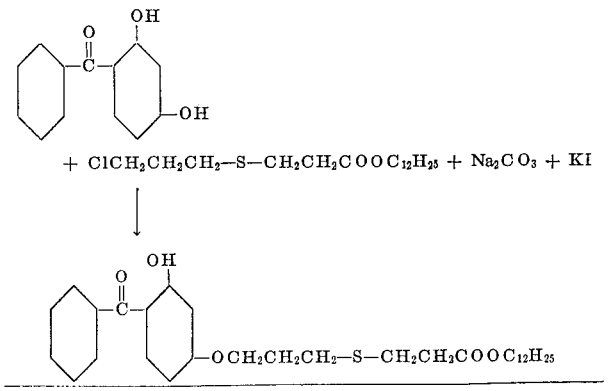

214 grams (1 mole) of dihydroxybenzophenone, 116 grams (1.1 mole) of anhydrous sodium carbonate, 16.6 grams (0.1 mole) of potassium iodide, 350.5 grams (1.0 mole) of lauryl-3-chloropropylthiopropionate (prepared as set forth below) and 1 liter of acetone (solvent) were heated for 5 hours at 150° C. in an autoclave. After the reaction the mixture was cooled, added to 1 liter of water and the acetone stripped by distillation with some water. The water later was separated and the remaining product was crystallized from isopropanol. The yield of 2-hydroxy-4-(oxypropyl-3-thio lauryl-propionate) benzophenone was 503 grams (95 percent of theory), M.P. 62°–64° C.

In this general procedure the reaction time employed was 5–10 hours but this can be varied. Similarly, crystallization can be accomplished from hexane or other hydrocarbon solvents rather than isopropanol. The yields in general were 85–95 percent.

To make other compounds within the invention in place of lauryl-3-chloropropylthiopropionate, there can be used lauryl-3-chloropropylthioacetate, lauryl-2-chloroethylthioacetate, lauryl-2-chloroethylthiopropionate, phenyl-3-chloropropylthiopropionate, methyl-3-chloropropylthioacetate, butyl-3-chloropropylthioacetate, docosyl-4-chlorobutylthioacetate, octadecenyl-3-chloropropylthioacetate, cyclohexyl-2-chloroethylthioacetate, benzyl-3-chloroethylthiopropionate and the like.

These intermediate chlorothioester esters are prepared in 95–100 percent yields by reacting mercaptoesters with chlorobromohydrocarbons according to the following equation, for example, $ClCH_2CH_2CH_2Br + HSCH_2COOC_4H_9 + Na_2CO_3$
$ClCH_2CH_2SCH_2COOC_4H_9bzNaBr + NaHCO_3$ For example the 3-chloropropyl lauryl thiopropionate employed in the representative example for Method A was prepared as follows.

157.5 grams (1 mole) of 1,3-chlorobromopropane, 274 grams (1 mole) of lauryl mercaptopropionate, 122.2 grams (1.2 mole) of sodium carbonate and 1 liter of acetone were mixed and heated under reflux for 16 hours. The mixture was added to 3 liters of water and the upper layer was separated and washed with 1 liter of water and dried with sodium sulfate. The yield of lauryl-3-chloropropylthiopropionate was 332 grams or 95 percent of theory. The product was a colorless oil. The structure was substantiated by infrared data and sulfur and halogen analyses.

Method B

An appropriate mono allyl or vinyl ether of a dihydroxybenzophenone is reacted with a mercaptan alkanecarboxylic acid ester in the presence of an alkali metal or alkoxide catalyst. The product obtained was recrystallized from isopropanol or hexane and the yield was 60–90 percent of theory.

The equation for a typical reaction is

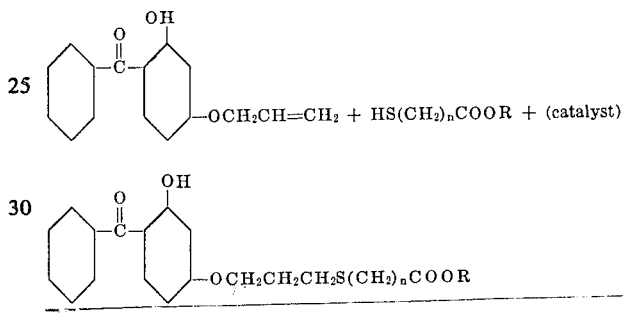

In a specific example there was prepared 2-hydroxy-4-(oxypropyl-3-thio-lauryl acetate) benzophenone by reacting 260 grams (1 mole) of lauryl thioglycolate ($HSCH_2COOC_{12}H_{25}$) with 260 grams (1 mole) of 2-hydroxy-4-allyloxybenzophenone in 1 liter of t-butanol containing 2.3 grams (0.1 mole) of sodium. The reaction was carried out by heating under reflux for 6 hours. The product was isolated by cooling and filtering the crystalline solid and by recrystallizing from hexane. The yield was 415 grams (85 percent of theory), M.P. 39°–41 C.

Method C

This method is a modification of method B wherein instead of a catalyst irradiation with ultraviolet light is used to achieve the reaction of the allyl or vinyl ether of a dihydroxybenzophenone with a mercaptan alkanecarboxylic acid ester. A quartz reaction vessel is employed to insure maximum light transmission. The reaction is preferably carried out in an inert solvent, e.g. a hydrocarbon such as benzene, toluene, xylene, aromatic naphtha, hexane, petroleum ether, etc. yields of 50 to 90 percent have been obtained.

In a specific example there was prepared 2-hydroxy-3-methyl-4-(oxypropyl-3-thio lauryl propionate) benzophenone by reacting 277 grams (1 mole) of 2-hydroxy-3-methyl-4-allyloxybenzophenone with 274 grams (1 mole) of lauryl mercaptopropionate ($HSCH_2CH_2COOC_{12}H_{25}$) in 1 liter of benzene and irradiating for 100 hours with an ultraviolet lamp. Specifically there was employed a quartz lamp which was a G. E. lamp, Code H 100 PSP 38.4. The yield of 2-hydroxy-3-methyl-4-(oxypropyl-3-thio lauryl-propionate) benzophenone was 380 grams (70 percent of theory), a crystalline solid M.P. 70°–73° C.

In the following tests the compound 2-hydroxy-4-octoxybenzophenone was employed simply as a comparison. It was particularly surprising that the compounds of the invention not only imparted to the polymers ultraviolet-light stability but also heat stability in view of the poor heat stability imparted by 2-hydroxy-4-octoxybenzophenone.

TABLE 1

| Compound | Name | Method of preparing | M.P., °C. | K values coefficient in isopropanol |
|---|---|---|---|---|
| 1 | 2-hydroxy-4-octoxybenzophenone | | 49–50 | 52 (288 mµ) |
| 2 | 2-hydroxy-4-(oxypropyl-2-thiolauryl propionate) benzophenone. | A or B | 62–64 | 20.7 (288 mµ) |
| 3 | 2-hydroxy-4-(oxypropyl-2-thiolauryl acetate) benzophenone. | A or C | 39–41 | 29.7 (287 mµ) |
| 4 | 2-hydroxy-4-(oxypropyl-3-thiobutyl propionate) benzophenone. | A | Liquid | 26.8 (288 mµ) |
| 5 | 2-hydroxy-3-methyl-4-(oxypropyl-2-thio lauryl propionate) benzophenone. | C or A | 70–73 | 30.1 (288 mµ) |

The compounds were used to stabilize polypropylene as shown in table 2. In table 2 the concentrations of compound are per 100 parts of polymer (phr); AA designates an accelerated aging test of the polypropylene in the form of 50-mil film in a circulating air oven at 150° C; and Weatherometer indicates an ultraviolet-light test using an Atlas twin-arc Model DMC-HR using the procedure in ASTM Designation E-42-6 5.

The compounds were milled into the polymer.

TABLE 2

| Compound | Concentration (phr.) | AA (hours) | Weatherometer (hours) |
|---|---|---|---|
| 1 | 1.0 | 96 | 160 |
| 2 | 0.8 | 1296 | 220 |
| 3 | 1.0 | 1408 | 200 |
| 4 | 1.0 | 1240 | 200 |
| 5 | 1.0 | 1500 | 220 |
| 1 | 0.10 (a)* 0.30 (b) | 96 | 160 |
| 2 | 0.25 | 778 | |

*(a) compound 1

(b) distearyl thiodipropionate

Compound 2 of the above table, it will be observed, is better than a combination of 2-hydroxy-4-octoxybenzophenone and distearyl thiodipropionate by a factor of at least 8.

In an accelerated oven aging test, at 150° C., there was employed a basic mixture of 60 percent polypropylene (Diamond Shamrock 4 melt flow) and 40 percent asbestos (Aplex 101), to 100 parts of the basic mixture there was added the indicated parts of the formulations set forth in table 3.

TABLE 3

Accelerated Oven Aging Tests

| Stabilizer Systems | Amt. pts./ 100 mixtr | Hrs. to Degrade |
|---|---|---|
| Disterdap | 0.15 | 17 |
| Topanol CA | 0.05 | |
| (Hindered condensed phenol) | | |
| Disterdap | 0.15 | |
| (Distearyl thiodipropionate) | | |
| Topanol CA | 0.05 | 65 |
| 2-Hydroxy-4-octoxybenzophenone | 0.50 | |
| 2-Hydroxy-4-(lauryl oxypropyl-3- thiopropionate)benzophenone | 0.05 | 312 |

The compounds were also tested as ultraviolet-light stabilizers in a polyvinyl chloride composition. Thus a sheet was prepared of the following formulations:

TABLE 4

| | |
|---|---|
| Polyvinyl (Geon 103 EP) | 100 parts |
| K. 120N (standard acrylate impact modifier) | 3 parts |
| Kane Ace B–12 (impact modifier) | 15 parts |
| Dibutyltin bis (isooctyl thioglycolate) | 2 parts |
| Advawax 135 | 0.75 parts |
| 2-hydroxy-4-(oxypropyl-3-thio lauryl propionate) benzophenone | 0.5 parts |

In accelerated ultraviolet-light tests for a period of 24 hours, in the formulation of table 4, the compound of the invention gave a much more light-stable product than either a formulation with no ultraviolet-light stabilizer or a stabilizer containing the compound 2-hydroxy-4-octoxybenzophenone.

The compounds of the present invention are also useful as light filters for suntan creams and cosmetic preparations and as an additive to protect material from deterioration due to ultraviolet radiation. In an $LD_{50}$ study with rats, the toxicity of 2-hydroxy-4-(oxypropyl- 3-thio lauryl propionate) benzophenone was extremely low being greater than 20 grams per kilo of body weight.

What is claimed is:

1. A compound having the formula

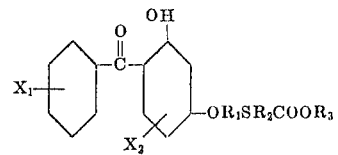

where
$X_1$ or $X_2$ is H, OH, $R_4$, $OR_4$ or halogen, $R_1$ is alkylene of two to six carbon atoms, $R_2$ is alkylene one to four carbon atoms, $R_3$ is hydrocarbyl of one to 22 carbon atoms and $R_4$ is alkyl or hydrocarbon aryl of one to 22 carbon atoms.

2. A compound according to claim 1 wherein $R_1$ is alkane of two to three carbon atoms and $R_2$ is of one to two carbon atoms.

3. A compound according to claim 2 wherein $X_1$ is hydrogen.

4. A compound according to claim 3 wherein $X_2$ is hydrogen.

5. A compound according to claim 4 wherein $R_3$ is alkyl.

6. A compound according to claim 3 wherein $X_2$ is chloro or lower alkyl and $R_3$ is alkyl.

7. A compound according to claim 2 wherein $X_1$ is hydroxy or chloro and $X_2$ is hydrogen.

8. A compound according to claim 1 which is 2-hydroxy-4-(oxypropyl-3-thiolauryl propionate) benzophenone.

9. A compound according to claim 1 which is 2-hydroxy-4-(oxypropyl-3-thiolauryl acetate) benzophenone.

10. A compound according to claim 1 which is 2-hydroxy-3-methyl-4-(oxypropyl-3-thiolauryl propionate) benzophenone.

11. A compound according to claim 1 which is 2-hydroxy-4-(oxypropyl-3-thiobutyl propionate) benzophenone.